United States Patent [19]

Perthus

[11] Patent Number: 4,731,713

[45] Date of Patent: Mar. 15, 1988

[54] FOG LAMP

[75] Inventor: Peter Perthus, Stuttgart, Fed. Rep. of Germany

[73] Assignee: Robert Bosch GmbH, Stuttgart, Fed. Rep. of Germany

[21] Appl. No.: 843,171

[22] Filed: Mar. 24, 1986

[30] Foreign Application Priority Data

Jul. 31, 1985 [DE] Fed. Rep. of Germany ....... 3527391

[51] Int. Cl.⁴ .......................... F21V 7/06; F21V 7/08
[52] U.S. Cl. .................................... 362/302; 362/61; 362/82; 362/297; 362/298; 362/304; 362/346
[58] Field of Search .................... 362/61, 80, 82, 297, 362/298, 302, 304, 346

[56] References Cited

U.S. PATENT DOCUMENTS

| 1,306,511 | 6/1919 | Ames, Jr. | 362/304 |
| 1,385,429 | 7/1921 | Crockett et al. | 362/304 |
| 1,546,281 | 7/1925 | Brown | 362/297 |
| 4,612,608 | 9/1986 | Peitz | 362/297 |

Primary Examiner—Samuel Scott
Assistant Examiner—Allen J. Flanigan
Attorney, Agent, or Firm—Michael J. Striker

[57] ABSTRACT

A fog lamp is comprised of a reflector and a pane connected to the reflector. An incandescent lamp is positioned inside the reflector which has a lower portion formed by paraboloid and an upper portion the vertical cross-section of which is formed by ellipse while its horizontal cross-section is formed by parabola. The upper and lower portions have a common focus and a common focal length.

2 Claims, 4 Drawing Figures

FOG LAMP

BACKGROUND OF THE INVENTION

The present invention relates to a fog lamp for a motor vehicle of the type having a reflector with a light element positioned therein.

Fog lamps or headlights of the foregoing type are normally positioned very high at the front wall of the body of the vehicle, for example at the level of 1 m so that according to a statutory adjustment of the headlight a twilight limit of the light beam occurs approximately 50 meters before the vehicle on the roadway. The vertical extension of the light beam is then not sufficient to illuminate the area of the roadway up to the twilight limit, specifically the tarmac of the roadway immediately before the motor vehicle. In order to avoid this disadvantage a vertically refractive optical medium is additionally required on the transparent pane of the headlight; the use of such medium however substantially increases manufacturing costs of the fog lamp.

SUMMARY OF THE INVENTION

It is an object of the present invention to provide an improved fog lamp for a motor vehicle.

It is another object of the present invention to avoid the above described disadvantage of conventional fog lamps by simple means.

These and other objects of the invention are attained by a fog lamp for a motor vehicle, comprising a reflector, a transparent pane connected to said reflector, and a light source accommodated in said reflector, said reflector having an upper portion and a lower portion separated from each other by a horizontal central plane, said lower portion being formed by a portion of paraboloid, said upper portion constituting a reflection surface which has a vertical section formed by ellipse and a horizontal section formed by parabola.

The invention is based on the idea that a required breaking/scattering in the downward direction would be given for the area of the roadway illuminated by a portion of the light beam by the configuration of the respective portion of the reflector.

The focus of the paraboiloid, the parabola and the ellipse is the same and forms a focus of the reflector. Thereby a rough light beam with a concentrated core which is required would maintain a necessary twilight level in accordance with a horizontal scattering.

The focal lengths of the paraboloid, parabola and ellipse are identical and form a local length of said reflector. Thereby the entire reflector surface is smooth.

The light source may be an incandescent lamp positioned in the region of said focus, said incandescent lamp being cylindrical and having an axis which is horizontal and extends at right angles to an optical axis of the fog lamp, said focus lying with said incandescent lamp.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
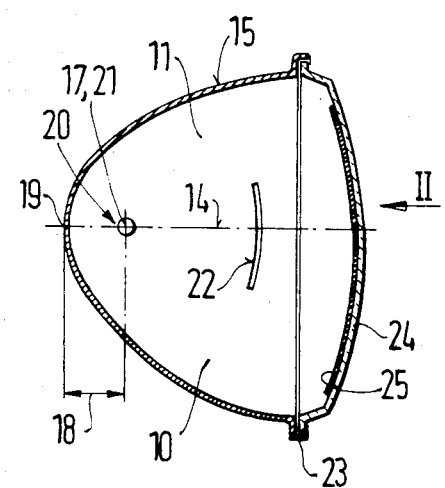
FIG. 1 is a vertical cross-section through a fog lamp for a power vehicle.
Figure 2:
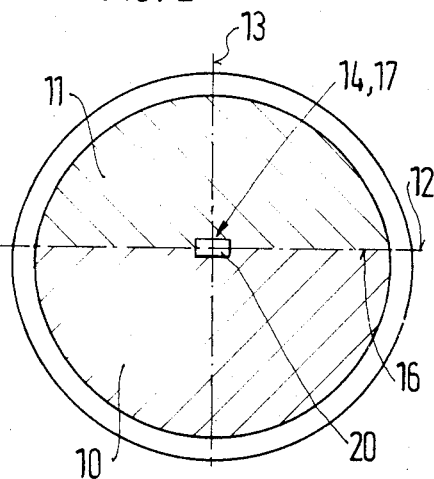
FIG. 2 is a front view of the reflector of the fog lamp of FIG. 1, seen in the direction of arrow II.
Figure 3:
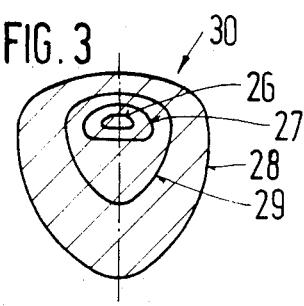
FIG. 3 shows a rough light distribution generated by the reflector on a traveling screen.

Referring now to the drawings in detail, a reflector of the fog lamp for a power vehicle, shown in FIGS. 1 and 2, is comprised of a lower portion 10 and an upper portion 11 which contact each other along a horizontal central plane 12 of the reflector. A vertical central plane 13 and the horizontal central plane 12 intersect in an optical axis 14. The lower portion 10 of the reflector is a portion of the paraboloid while the upper portion 11 forms a reflection surface, the vertical section of which, e.g. the section along the vertical central plane 13, is a portion of ellipse 15 and the horizontal section of which, e.g. the section extending along the horizontal central plane 12 is a portion of parabola 16.

Focus 17 of the reflector 10, 11 is also the focus for the paraboloid forming the lower portion 10 and also for parabola 16 and for ellipse 15. The corresponding focal lengths of paraboloid 10 and ellipse 15 as well as parabola 16 are also identical so that the reflector has a single focal length 18 which is the distance between apex 19 of the reflector and its focus 17.

An incandescent lamp 20 which is a light source is formed as a cylindrical glowing spiral the cylindrical axis 21 of which is arranged at right angles to the optical axis 14 and extends horizontally. Focus 17 of the reflector 10, 11 is thus positioned inside the incandescent lamp 20. A circular screen 22 screens off direct light rays which are not reflected by the reflector 10, 11.

At an outlet opening 23 of the reflector, a transparent pane 24 is connected to the lower and upper portions 10, 11 of the reflector. An optical medium 25 is provided at the inner side of the pane 24, which optical medium scatters horizontal light beams passing therethrough.

The light rays generated by light element 20 and reflected by reflector 10, 11 form without the pane 24, on a traveling screen (lying in the plane of the drawing) and perpendicular to the optical axis 14, a rough light beam 30. Four isolux lines or lines of the same light intensity 26 to 29 derive from that rough light beam. With reference to the light center position formed by the light rays within the isolux line 26 the lower area has many times greater vertical expansion than that of the upper area; thereby specifically the tarmac of the roadway would be sufficiently illuminated.

Figure 4:
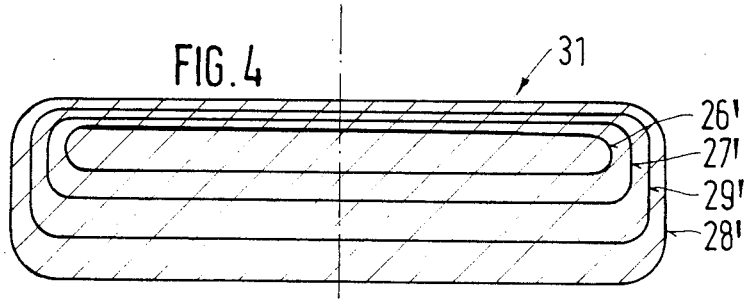
FIG. 4 illustrates a light beam affected by a transparent pane on the traveling screen.

The horizontal scattering optical medium 25 on the pane 24 scatters the rough light beam 30 passing therethrough with isolux lines 26' to 29' so that a configuration shown in FIG. 4 is received on the traveling screen. The horizontal extension of the light beam 31 is such that first of all the side illumination or the illumination of both sides of the roadway results.

It will be understood that each of the elements described above, or two or more together, may also find a useful application in other types of fog lamp differing from the types described above.

While the invention has been illustrated and described as embodied in a antifog headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A fog lamp for a motor vehicle, comprising a reflector, a transparent pane connected to said reflector, and an incandescent lamp accommodated in said reflector, said reflector having an upper portion and a lower portion separated from each other by a horizontal central plane, said lower portion being formed by a portion of paraboloid, said upper portion constituting a reflection surface which has every vertical section formed by ellipse and every horizontal section formed by parabola, wherein focuses of the paraboloid, parabola and ellipse are identical and form a focus of said reflector, said incandescent lamp being positioned in the region of said focus and being cylindrical and having an axis which is horizontal and extends at right angles to an optical axis of the fog lamp, said focus lying within said incandescent lamp, whereby a rough light beam with a concentrated core for a required light-dark limit is obtained.

2. The fog lamp as defined in claim 1, wherein focal lengths of the paraboloid, parabola and ellipse are identical and form a local length of said reflector.

* * * * *